Oct. 26, 1965 W. A. CHRISTOPHERSON 3,214,601
PROTECTIVE CIRCUIT
Filed Aug. 16, 1961
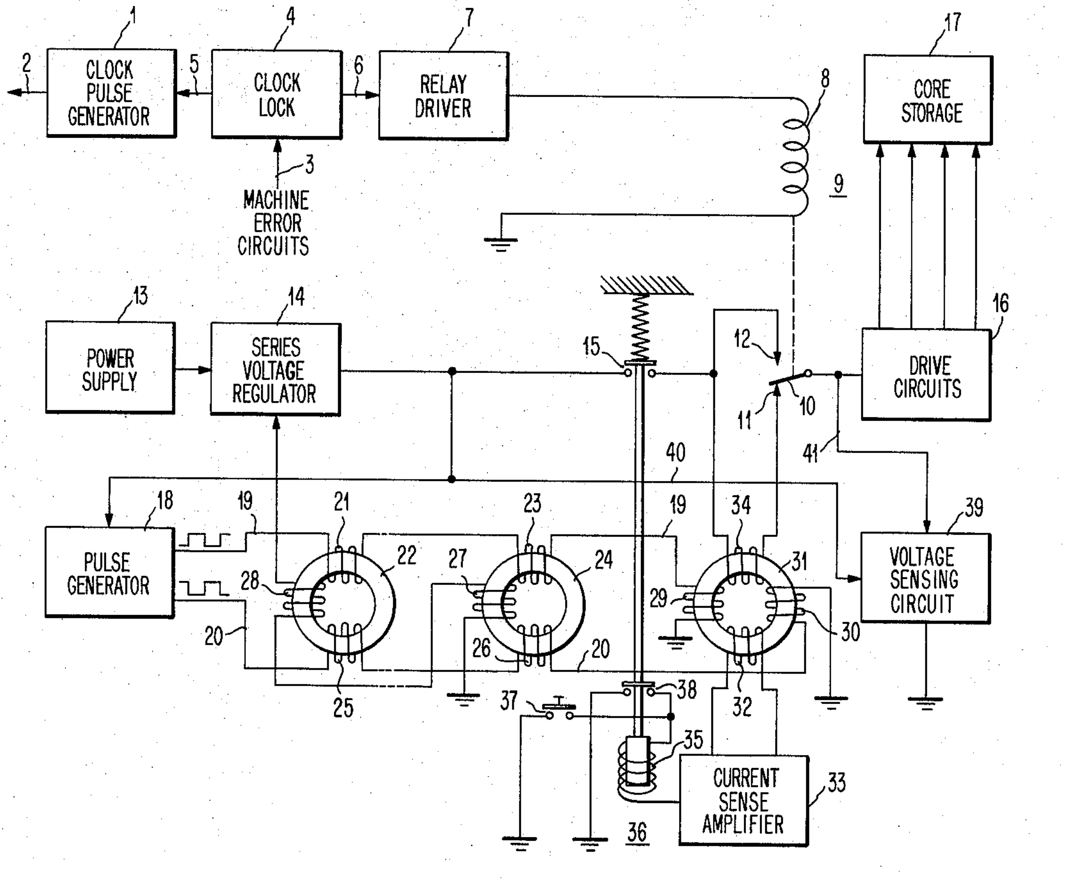
*INVENTOR.*
WARREN A. CHRISTOPHERSON
*BY* Carl W. Laumann Jr.
ATTORNEY United States Patent Office 3,214,601

Patented Oct. 26, 1965

3,214,601

PROTECTIVE CIRCUIT

Warren A. Christopherson, San Jose, Calif., assignor to International Business Machines Corporation, New York, N.Y., a corporation of New York Filed Aug. 16, 1961, Ser. No. 131,886
8 Claims. (Cl. 307—88)

This invention relates generally to protective circuits for pulse type devices and in particular to a protective arrangement for the drive circuits used in magnetic core storage devices.

Circuits designed for a low duty factor operation are normally very susceptible to destruction if the duty cycle varies appreciably. Protection for such circuits is very difficult to provide due to the fact that normal operation sees high currents of very short duration, whereas abnormal operation may result in destruction with a much smaller continuous current. In a magnetic core storage system using typical pulse type circuits which this invention is designed to protect, the current driver transistors are designed for low duty factor operation. A typical transistor driver may have a peak current of from 250 to 500 milliamperes and a duty factor between 20 and 30 percent. Since transistors are very easily destroyed by excessive currents for even a short period of time, it is essential that fast, fail-safe, overcurrent protection be provided for practical application of such drive circuits.

Fuse protection, which provides a satisfactory solution in many protective arrangements, is both too slow and too expensive for the protection of individual transistor drive circuits. Furthermore, the addition of fuses into the drive circuits add undesirable circuit resistance rendering voltage regulation a more difficult problem. Additionally, the protection available from fusing is limited because of the variable loading resulting from temperature compensation and intermittent computer operation.

In this invention overall circuit protection is provided by means of a logically controlled system which senses small currents during the time when there should be zero current and bypasses large currents which flow during normal operation. In this manner no circuit resistance is added during normal computer operation and very small abnormal circuits may be detected and interrupted before circuit damage occurs.

The current drivers are normally energized through a first circuit path which includes no additional resistance. The introduction of an error in computer operation, which is normally a necessary consequence of an improper driver operation, stops the normal computer operation and switches the drive circuits to a second, alternate path which senses the amount of current supplied to the drivers from the power supply. Should the amount of current flowing to the drive circuits be excessive, the circuit is interrupted to disconnect the power supply from the drive circuits. The current sensing means used in this invention includes a magnetic core which is switched between two remanent states by a current sufficient only to change the state of an unbiased core. An additional winding energized by a measure of the current supplied to the drive circuits operates to bias the core well into the saturated region by the flow of abnormal current to the drive circuits. When this occurs, the switching windings are no longer sufficient to change the remanent flux and no voltage is produced by the output winding on the core. The absence of a voltage at the output winding is effective to disconnect the power supply from the drive circuits, thereby averting damage to the core storage system and its associated drivers.

It is therefore an object of this invention to provide an improved protective system for pulse type circuits.

It is another object of this invention to provide circuit protection for magnetic core storage systems which does not introduce additional resistance into the drive circuits.

Another object of this invention is to provide an improved logical protective circuit for magnetic core storage systems.

Still another object of this invention is to provide a protective circuit which is unaffected by high current pulses, but which is operative to disconnect the load in response to small abnormal currents.

A further object of this invention is to provide a logically controlled system which senses small currents which flow when there should be zero current and which bypasses large currents flowing during normal operation.

The foregoing and other objects, features and advantages of the invention will be apparent from the following more particular description of a preferred embodiment of the invention as illustrated in the accompanying drawing.

In the drawing:

The drawing is a schematic representation of portions of a magnetic core storage system utilizing this invention.

In the drawing, a clock pulse generator 1 supplies periodic control pulses on line 2 to the various control circuits in a computer utilizing the magnetic core storage system. In the event of an error in the operation of the machine, line 3 is operative to turn the clock lock trigger 4 on. The computer and the circuits for developing a signal in response to a machine error are not shown since they are well known and do not comprise a part of the invention. In response to an error signal on line 3 the clock lock trigger provides an output on line 5 which is effective to hold the clock pulse generator 1 off and prevent further generation of periodic control pulses. At the same time the clock lock trigger 4 provides an output on line 6 which turns off relay driver 7 to deenergize winding 8 of relay 9.

When relay 9 is deenergized, armature 10 makes contact with normally closed contact 11. Conversely, when winding 8 of relay 9 is energized, armature 10 makes contact with contact 12. The transition from contact 11 to contact 12, or contact 12 to contact 11, is accomplished wihout interrupting the circuit completed by these contacts since they are of the "make before break" type.

When armature 10 is in the energized position a circuit completed from power supply 13 through voltage regulator 14 contacts 15, 12 and 10 to memory drive circuits 16. The drive circuits 16 are under the control of a processing unit and operate to readout and store data in the core storage unit 17.

Voltage regulator 14 may be of the type described in U.S. Patent 2,919,434 to A. F. Mestre. This regulator operates to compensate for variations in the output signal from storage unit 17 due to changes in the core temperature by varying the voltage to the drive circuits according to the magnitude of the output signal derived from test cores 22 and 24 located within the physical confines of the core storage device 17. In this embodiment a pulse generator 18 operates to provide alternate output pulses of the same polarity and magnitude on lines 19 and 20. A pulse on line 19 passes through winding 21 on core 22 and winding 23 on core 24 to place the cores in a state of positive remanence. The next pulse in time appears on line 20 and passes through winding 25 on core 22 and winding 26 on core 24 to leave the cores in a state of negative remanence. The flux change caused by the alternating pulses applied to the winding on cores 22 and 24 induces a voltage in output windings 27 and 28 associated with these cores. Output windings 27 and 28 are connected in series so that the voltage produced across the windings is additive. While only two cores are shown it will be understood that in some cases a larger number of cores may be used to provide better sampling of the average temperature within the core storage unit 17. With more cores the additive connection of the sense windings provides a larger voltage to the voltage regulator 14.

Lines 19 and 20 are conected to drive windings 29 and 30 on core 31. The current through these windings changes the remanent state of core 31 in a manner similar to that used in the operation of cores 22 and 24. The flux changes in core 31 produce an output voltage across winding 32 connected to current sense amplifier 33.

In the normal run condition, that is with winding 34 deenergized, windings 29 and 30 are effective to produce a flux change within core 31 and the output voltage produced across winding 32 is amplified in current sense amplifier 33. To hold relay coil 35 of relay 36 energized in normal operation, pushbutton 37 is depressed to complete the circuit from current sense amplifier 33 through relay winding 35 to ground. The relay 36 will pick up closing contact 38 to seal the relay in the energized position. Contact 15 is closed at the same time to connect the power supply 13 through the voltage regulator 14 to the drive circuits 16 for core storage 17. In the event of a machine error, the error signal on line 3 operates clock lock trigger 4 to produce a signal through line 6 to relay drive 7 which deenergizes winding 8 of relay 9. Armature 10 moves to the deenergized position transferring the connection to the drive circuits from contact 12 to contact 11. The resultant current through winding 34, when excessive, is operative to bias core 31 well into the saturated region. When this condition prevails the current through windings 29 and 30 is insufficient to produce a flux change within the core, consequently no output voltage is produced across winding 32. Since no input signal exists to current sense amplifier 33, winding 35 is deenergized and relay 36 drops out to open contacts 15 and disconnect power supply 13 from drive circuits 16. Latching contact 38 for relay 36 is also opened to hold this relay deenergized until reset by pushbutton 37.

It is possible that errors may be produced as a result of an overvoltage condition to the drive circuits. To protect the memory against this type of failure, an overvoltage sensing circuit 39 is included. An input line 40 is supplied from the output of the voltage regulator 14 to the input of voltage sensing circuit 39. When the voltage on this line exceeds a predetermined value, a current is drawn through line 41. This type of circuit is well known in the art and the magnitude of this current is such that when drawn through winding 34 it operates to bias core 31 well into the saturated region. This simulates a failure in the drive circuits to disconnect the power supply from the drive circuits in the manner previously described.

While the invention has been particularly shown and described with reference to a preferred embodiment thereof, it will be understood by those skilled in the art that various changes in the form and details may be made therein without departing from the spirit and scope of the invention.

What is claimed is:

1. In a data storage system having pulse type drive circuits operable in response to periodic control pulses, protective means comprising a source of electrical energy, a first current supply path to said drive circuits, a second current supply path to said drive circuits, overcurrent sensing means associated with said second path, and means for switching the connection between said source and said drive circuits from said first to said second path in the absence of said control pulses.

2. In a data storage system having pulse type drive circuits operable in response to periodic control pulses, protective means comprising a source of electrical energy, a first current supply path to said drive circuits, a second current supply path to said drive circuits, overcurrent sensing means associated with said second path, means for developing a control signal in the absence of said control pulse, and means for switching the connection between said source and said drive circuits from said first to said second path in response to said control signal.

3. In a data storage system having pulse type drive circuits operable in response to periodic control pulses, protective means comprising a source of electrical energy, a first current supply path to said drive circuits, a second current supply path to said drive circuits, overcurrent sensing means associated with said second path for developing a control signal in response to a predetermined current flow in said second path, means for switching the connection between said source and said drive circuits from said first to said second path in the absence of said control pulses, and means responsive to said control signal for interrupting the connection between said source and said drive circuits.

4. In a data storage system having pulse type drive circuits operable in response to periodic control pulses, protective means comprising means for developing a first control signal in the absence of said control pulses, a source of electrical energy, a first current supply path to said drive circuits, a second current supply path to said drive circuits, overcurrent sensing means associated with said second path for developing a second control signal in response to a predetermined current flow in said second path, means for switching the connection between said source and said drive circuits from said first to said second path in response to said first control signal, and means responsive to said second control signal for interrupting the connection between said source and said drive circuits.

5. In a data processing system, means for generating periodic control pulses, means for disabling said generating means in response to an error condition in said system, a source of electrical energy, data storage means, drive circuits for said storage means operable in response to said periodic control pulses, a first current supply path from said source to said drive circuits, a second current supply path from said source to said drive circuits, switch means responsive to said generator disabling means to change the connection between said source of electrical energy and said drive circuits from said first to said second current path when said generator is disabled, overcurrent sensing means in said second path including a core of magnetic material, a first winding on said core, means connecting said first winding in circuit with said second current path to be traversed by a measure of the current passing therethrough, said first winding being operative to inhibit remanent flux changes when the current therethrough exceeds a predetermined value, drive windings on said core, means including said drive windings for reversing the remanent state of said core, a sense winding on said core for detecting flux changes within said core, and means connected to said sense winding for interrupting the connection of said energy source to said drive circuits in response to an absence of detected flux reversals.

6. In a data processing system, means for generating periodic control pulses, means for disabling said generating means in response to an error condition in said system, a source of electrical energy, data storage means, drive circuits for said storage means operable in response to said periodic control pulses, a first current supply path from said source to said drive circuits, a second current supply path from said source to said drive circuits, switch means responsive to said generator disabling means to change the connection between said source of electrical energy and said drive circuits from said first to said second current path when said generator is disabled, overcurrent sensing means in said second path including a core of magnetic material, a first winding on said core, means connecting said first winding in circuit with said second current path to be traversed by the current passing therethrough, drive windings on said core, means for energizing said drive windings for changing the remanent state of said core, a sense winding on said core for detecting flux changes within said core, the current through said drive windings and said first winding coacting to prevent remanent flux changes when the current in said first winding exceeds a predetermined value, and means connected to said sense winding for interrupting the connection of said energy source to said drive circuits in response to an absence of detected flux reversals.

7. In a data processing system, means for generating periodic control pulses, means for disabling and generating means in response to said error condition in said system, a source of electrical energy, data storage means, drive circuits for said storage means operable in response to said periodic control pulses, a first current supply path from said source to said drive circuits, a second current supply path from said source to said drive circuits, switch means responsive to said generator disabling means to change the connection between said source of electrical energy and said drive circuits from said first to said second current path when said generator is disabled, overcurrent sensing means in said second path including a core of magnetic material, a first winding on said core, means connecting said first winding in circuit with said second current path to be traversed by the current passing therethrough, said first winding being operative to inhibit remanent flux changes when the current therethrough exceeds a predetermined value, drive windings on said core, means for energizing said drive windings for changing the remanent state of said core, a sense winding on said core for detecting flux changes within said core, and means responsive to said sense winding for interrupting the connection of said energy source to said drive circuits in response to inhibited flux changes.

8. In a data processing system, means for generating periodic control pulses, error responsive means for developing a signal in response to an error condition in said system, a source of electrical energy, a data storage system, drive circuits for said storage system operable in response to said periodic control pulses, a first current supply path from said source to said drive circuits, a second current supply path from said source to said drive circuits, said second path including overcurrent sensing means, switch means responsive to a signal from said error responsive means to change the connection between said source of electrical energy and said drive circuits from said first to said second current path, said current sensing means including a core of magnetic material, a first winding on said core, means connecting said first winding in circuit with said second current path to be traversed by a measure of the current passing therethrough, drive windings on said core, means including said drive windings for changing the remanent state of said core, a sense winding on said core for detecting flux changes within said core, said first winding being operative to inhibit remanent flux changes when the current therethrough exceeds a predetermined value, and means connected to said sense winding for interrupting the connection of said energy source to said drive circuits in response to an absence of detected flux changes.

References Cited by the Examiner

UNITED STATES PATENTS

| | | | |
|---|---|---|---|
| 2,910,626 | 10/59 | Koros | 317—20 |
| 3,015,039 | 12/61 | Morgan | 340—174 |
| 3,079,533 | 2/63 | Kotheimer | 307—88 |
| 3,121,174 | 2/64 | Schaefer | 307—88 |

IRVING L. SRAGOW, *Primary Examiner.*

UNITED STATES PATENT OFFICE
CERTIFICATE OF CORRECTION

Patent No. 3,214,601 October 26, 1965

Warren A. Christopherson

It is hereby certified that error appears in the above numbered patent requiring correction and that the said Letters Patent should read as corrected below.

Column 5, line 11, for "and" read -- said --; line 12, for "said", first occurrence, read -- an --.

Signed and sealed this 5th day of July 1966.

(SEAL)
Attest:

ERNEST W. SWIDER
Attesting Officer

EDWARD J. BRENNER
Commissioner of Patents